United States Patent [19]

Piper

[11] 4,003,159

[45] Jan. 18, 1977

[54] GAME CALL
[75] Inventor: Frank R. Piper, Delmont, Pa.
[73] Assignee: Penn's Woods Products, Inc., Delmont, Pa.
[22] Filed: Jan. 12, 1976
[21] Appl. No.: 648,412
[52] U.S. Cl. .................................................. 46/189
[51] Int. Cl.² ........................................... A63H 5/00
[58] Field of Search ....................................... 46/189

[56] References Cited
UNITED STATES PATENTS
2,958,157  11/1960  Tannehill .............................. 46/189

*Primary Examiner*—Hugh R. Chamblee
*Assistant Examiner*—Robert F. Cutting
*Attorney, Agent, or Firm*—Brown, Murray, Flick & Peckham

[57] ABSTRACT

A game call includes a rod-shaped striker member and a unitary sounder made up of a carrier having a U-shaped cross section and a sounder board also having a U-shaped cross section. The sounder board includes a sounder head having an elongated striker plate adhered to the top surface thereof while nested within the hollowed-out area formed by the U-shaped cross section of the carrier to thereby define an open-ended sound slot by the gap extending between the U-shaped configurations of the carrier and the sounder board.

5 Claims, 3 Drawing Figures

GAME CALL

BACKGROUND OF THE INVENTION

The present invention relates to a hand-operated game call for use by sportsmen while hunting wild game such as turkey. More particularly, the present invention relates to a hand-operated call for use by hunters to lure or otherwise provide a decoy for game within the vicinity of the sportsmen.

Known hand-operated call sounding devices of the type employed to simulate the sounds made by wild game, particularly turkey, are large and cumbersome for sportsmen to transport over rough terrain. These sounding devices are usually fragile and, therefore, particularly susceptible to damage.

SUMMARY OF THE INVENTION

It is an object of the present invention to provide an improved game call of the type which is hand-operated to simulate the sounds made by wild game.

It is a further object of the present invention to provide an improved game call of the hand-operated type wherein a sounder board is supported by a carrier in a spaced-apart relation to form an open-ended sound slot by a continuous gap between the sounder board and the carrier, thereby facilitating the radiation of audible sounds.

According to the present invention, there is provided a game call comprising the combination of a carrier including an elongated base and coextending support arms projecting laterally above the sides of the base to thereby form a carrier with a generally U-shaped cross section, a sounder board having a generally U-shaped cross section formed by an elongated planar sounder head having a planar top face coextending with and lying between two sounder arms, the sounder board being carried along its opposed sides by the sounder arms, the sounder arms are carried by the support arms of the carrier in such a manner to define an open-ended sound slot by the gap extending between the U-shaped configurations of the carrier and the sounder board, an elongated striker plate adhered to the top face surface of the sounder head, and means for vibrating the striker plate and thereby the sounder board to radiate audible sounds corresponding to a sound made by wild game from the open-ended sound slot.

In the preferred form of the game call according to the present invention, the aforementioned sounder arms each has perpendicular walls of uniform thickness and joined together along a web section. It is further preferred to provide the game call with coplanar terminal sides and ends by constructing the carrier and the sounder board in the form of equal dimensional rectangles.

These features and advantages of the present invention as well as others will be more fully understood when the following description is read in light of the accompanying drawings, in which.

Figure 1:
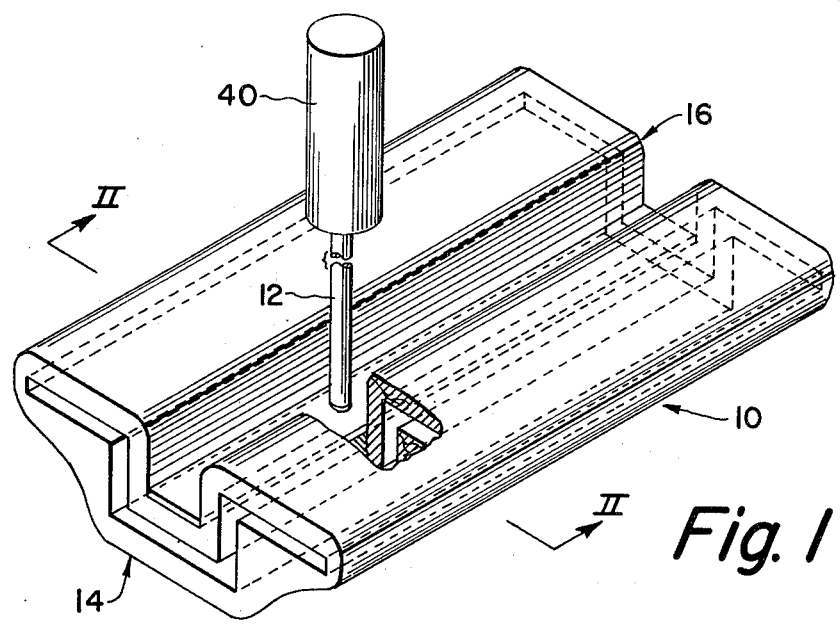
FIG. 1 is a perspective view of parts forming the game call according to the present invention.
Figure 2:
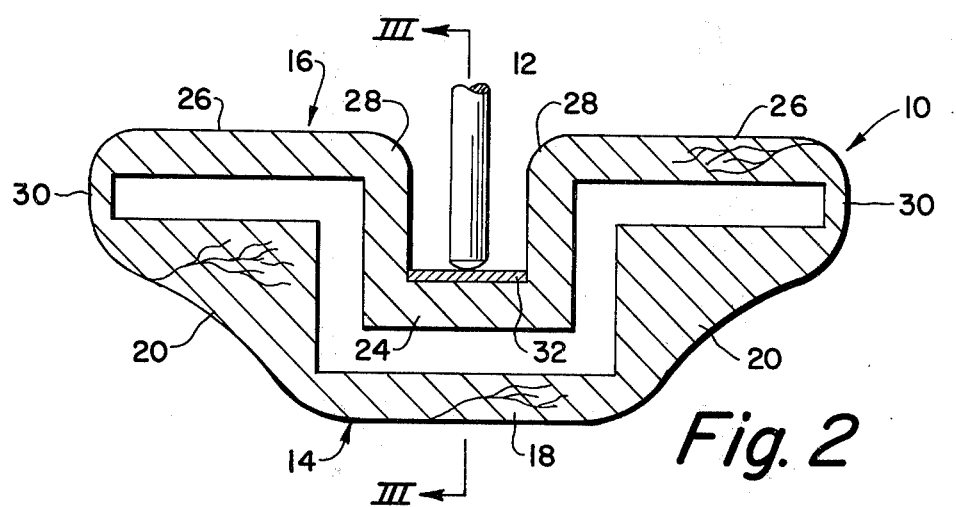
FIG. 2 is a sectional view taken along line II—II of FIG. 1.
Figure 3:
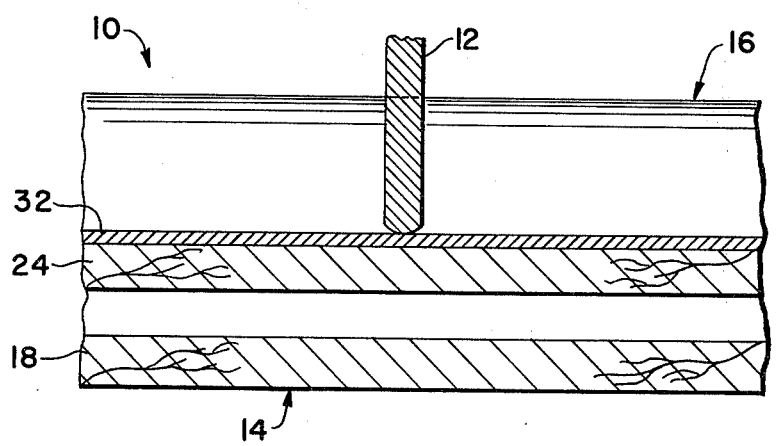
FIG. 3 is a sectional view taken along line III—III of FIG. 2.

As clearly illustrated in FIGS. 1–3 of the drawings, there is shown a call device 10 which has a generally rectangular shape as viewed from above in a plan view and an elongated rod 12 which forms part of the call device and will be more fully described hereinafter. The call device 10 is a unitary member which, for the purpose of disclosing the present invention, is subdivided into a carrier 14 and a sounder board 16. The carrier member 14 is made of a rectangularly-shaped base plate 18 with support arms 20 attached to the opposed sides of the base plate 18 in such a manner that the carrier defines, in cross section, a generally U-shaped configuration. In other words, the carrier has a generally hollow, longitudinal trough which is bounded along its bottom by the base plate 18 and along the opposed sides by arms 20. The outer terminal edges of the arms 20 are parallel. The outer face surface of the arms 20 has a generally concave profile to provide gripping surfaces for support within the palm portion of a sportman's hand.

The sounder board 16 essentially consists of an elongated planar sounder head 24 which preferably takes the form of a rectangular plate section and formed as an integral part of L-shaped sounder arms 26 which coextend with the sounder head. The sounder arms each has perpendicular walls of uniform thickness that are joined together along a web section 28. As clearly illustrated in FIGS. 1 and 2 of the drawings, the sounder board 16 has a generally U-shaped cross section formed by the integral relation between the sounder head 24 and the oppositely-extending sounder arms 26. The outer longitudinal edges of the sounder arms 26 are connected by thin web sections 30 to the outer longitudinal edges of the support arms 20. The height of the web section 30 defines the spaced relation between the sounder board and the carrier which is a uniform gap between the U-shaped configurations of the carrier and the sounder board. It is an essential feature of the present invention that this gap defines an open-ended sound slot whereby vibrations of the sounder board radiate from the end of the sounder board as well as from the sound slot. These vibrations are within an audible frequency range and they are produced in such a manner to simulate the sounds made by wild game, particularly turkey. A rectangularly-shaped metal plate 32 is adhered to the top face surface of the sounder head. The plate 32 is preferably made from aluminum whereas the remaining portions of the call device are made from suitably selected hardwood. The plate 32 provides necessary wear property because the rod member 12 is moved along the upper face surface of the striker plate in a generally perpendicular relation thereto so as to vibrate the sounder head incident to this movement. Thus, it will be understood that the member 12 is moved along in frictional contact with the face surface of plate 32 by preselected short strokes. As shown in FIG. 1, an enlarged cylindrical attachment 40 is secured to the upper end of the member 12. This attachment forms a mass employed to reinforce and intensify the amplitude and frequency of oscillation by the end of the member 12 which is in contact with the plate 32. I have found this attachment to be important to the simulation of the sounds made by wild turkey.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A game call comprising the combination of:
a unitary member consisting of a carrier and sounder board, said carrier including an elongated base and support arms projecting laterally above the opposed sides of said base to thereby define said carrier with a generally U-shaped cross section, said sounder board having a generally U-shaped cross section formed by an elongated planar sounder head having a planar top face coextending with and lying between two sounder arms, said sounder arms being connected to the support arms of said carrier by web sections in such a manner to define an open-ended sound slot by a gap formed between the U-shaped configurations of said carrier and said sounder board, an elongated striker plate adhered to the top face surface of said sounder head, and means for vibrating said striker plate and thereby said sounder board to radiate an audible sound corresponding to a sound made by wild game from said open-ended sound slot.

2. The game call according to claim 1 wherein said sounder arms are L-shaped thereby defining non-planar terminal edges interconnecting said sounder head and a support arm of said carrier.

3. The game call according to claim 1 wherein the terminal edges of the laterally-projecting support arms are parallel.

4. The game call according to claim 1 wherein said carrier and said sounder define equal dimensional rectangles by coplanar terminal ends and coplanar terminal sides.

5. The game call according to claim 1 wherein said sounder arms each has perpendicular walls of uniform thickness and joined together along one of said web sections.

* * * * *